United States Patent
Vasiladiotis et al.

(10) Patent No.: US 10,530,275 B2
(45) Date of Patent: Jan. 7, 2020

(54) CONTROL OF DC-TO-AC MODULAR MULTILEVEL CONVERTER

(71) Applicant: ABB SCHWEIZ AG, Baden (CH)

(72) Inventors: Michail Vasiladiotis, Zurich (CH); Alexandre Christe, Veysonnaz (CH); Tobias Geyer, Ennetbaden (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/342,440

(22) PCT Filed: Oct. 21, 2016

(86) PCT No.: PCT/EP2016/075342
§ 371 (c)(1),
(2) Date: Apr. 16, 2019

(87) PCT Pub. No.: WO2018/072837
PCT Pub. Date: Apr. 26, 2018

(65) Prior Publication Data
US 2019/0341862 A1 Nov. 7, 2019

(51) Int. Cl.
*H02M 7/5387* (2007.01)
*H02M 1/12* (2006.01)
*H02M 7/483* (2007.01)

(52) U.S. Cl.
CPC ......... *H02M 7/53875* (2013.01); *H02M 1/12* (2013.01); *H02M 7/483* (2013.01)

(58) Field of Classification Search
CPC .... H02M 7/53875; H02M 1/12; H02M 7/483; H02M 7/49
See application file for complete search history.

(56) References Cited

U.S. PATENT DOCUMENTS 8,766,570 B2 7/2014 Geyer et al.
9,590,530 B2 * 3/2017 Geyer .................. H02M 7/483
(Continued)

FOREIGN PATENT DOCUMENTS

EP 2 312 739 A1 4/2011
EP 2 469 692 A1 6/2012
(Continued)

OTHER PUBLICATIONS

Geyer et al. "Model Predictive Pulse Pattern Control", IEEE Transactions on Industry Applications, Mar./Apr. 2012, XP011434186, vol. 48, No. 2, pp. 663-676.
(Continued)

*Primary Examiner* — Kyle J Moody
(74) *Attorney, Agent, or Firm* — Birch, Stewart, Kolasch & Birch, LLP

(57) ABSTRACT

In a method of controlling a DC-to-AC Modular Multilevel Converter (MMC) having a three-phase AC side connected to a three-phase AC network and having a DC side connected to a DC network, the MMC has a double-star topology with a plurality of phase-legs. Each phase-leg has a first branch and a second branch. Each of the first and second branches includes a plurality of series connected converter cells. The method includes obtaining an Optimized Pulse Pattern (OPP) for the MMC. The method also includes adapting the OPP to the MMC by means of closed-loop pulse pattern control. The method also includes, based on the adapted OPP, sending firing signals to the plurality of cells of each branch.

20 Claims, 4 Drawing Sheets

(56) References Cited

U.S. PATENT DOCUMENTS

| | | | | |
|---|---|---|---|---|
| 10,367,407 B2* | 7/2019 | Geske | ............ | H02M 1/08 |
| 2018/0145579 A1* | 5/2018 | Spudic | ............ | H02M 1/12 |
| 2019/0199230 A1* | 6/2019 | Vasiladiotis | ........ | H02M 5/293 |

FOREIGN PATENT DOCUMENTS

| | | |
|---|---|---|
| EP | 2 725 706 A1 | 4/2014 |
| WO | WO 2014/046555 A1 | 3/2014 |
| WO | WO 2015/055444 A1 | 4/2015 |
| WO | WO 2015/078656 A1 | 6/2015 |

OTHER PUBLICATIONS

Geyer et al., "Model Predictive Pulse Pattern Control with Very Fast Transient Responses", IEEE, 2014, pp. 5518-5524.

Hoffmann et al., "A Novel Control Scheme for Medium Voltage Drives operated by Optimized Pulse Patterns", IEEE, 2015, pp. 4488-4495.

Huber et al., "Optimized Pulse Pattern Modulation for Modular Multilevel Converter High-Speed Drive", 15th International Power Electronics and Motion Control Conference, EPE-PEMC 2012 ECCE Europe, Novi Sad, Serbia, 2012, total 7 pages.

International Preliminary Report on Patentability, issued in PCT/EP2015/075342, dated Oct. 1, 2018.

International Search Report, issued in PCT/EP2016/075342, dated Jul. 25, 2017.

Written Opinion of the International Searching Authority, issued in PCT/EP2015/075342, dated Jul. 25, 2017.

* cited by examiner

CONTROL OF DC-TO-AC MODULAR MULTILEVEL CONVERTER

TECHNICAL FIELD

The present disclosure relates to a method of controlling a DC-to-AC (DC/AC) Modular Multilevel Converter (MMC).

BACKGROUND

An MMC is a power converter comprising series-connected cells (also known as modules or submodules), forming what is called a converter branch (also known as arm). These branches can be configured in several manners leading to dedicated converter topologies. Depending on whether these branches need to provide only positive or also negative voltages, the cell can be implemented by means of a half-bridge (unipolar) or a full-bridge (also called bipolar or H-bridge) cell, respectively. A Direct Current (DC)-to-three-phase Alternating Current (AC) MMC structure in double-star configuration may be used for interconnection of a three-phase utility grid, e.g., 50 Hz, with a DC grid, e.g. a microgrid with Distributed Generators (DG) such as in the form of photovoltaic power plants or wind turbines. Alternative applications include variable speed drives and battery energy storage systems (BESS).

SUMMARY

The present invention relates especially to a problem of medium voltage DC-to-AC MMC in double-star configuration which may operate with a relatively low number of cells and low switching frequencies, e.g., close to and including the fundamental frequency of the AC network. In such cases, the inherent advantages of double-star converters, such as superior harmonic performance as well as high current control bandwidth capabilities may be reduced.

In addition, conventional modulation methods such as Carrier-Based Pulse Width Modulation (CB-PWM) tend to perform poorly when operating at such low switching frequencies. In this case, it has been realized that use of programmed modulation methods such as optimized pulse patterns (OPPs) are preferred, since they allow for an active shaping of the harmonic spectrum. However, OPPs may not easily be applied to an MMC without the use of a sophisticated controller, mainly due to the presence of significant disturbances caused by the intrinsic cell capacitor voltage ripple. The latter prevents operation of the offline pre-calculated pulse pattern using a classic PI controller, which assumes that the current ripple is zero at the regularly spaced sampling instants.

In accordance with the present invention, a closed-loop pulse pattern control concept is used, e.g. of the type which may be referred to as Model Predictive Pulse Pattern Control (MP3C). Such a closed-loop pulse pattern control may be combined with the use of a circulating current controller, e.g. a dead-beat circulating current controller (DBC3). It will be shown that this concept can be interfaced in a very straight-forward manner to the upper layer voltage balancing control scheme of an MMC.

According to an aspect of the present invention, there is provided a method of controlling a DC-to-AC MMC having a three-phase AC side connected to a three-phase AC network and having a DC side connected to a DC network. The MMC has a double-star topology with a plurality of phase-legs. Each phase-leg has a first branch and a second branch. Each of the first and second branches comprises a plurality of series connected converter cells. The method comprises obtaining an OPP for the MMC. The method also comprises adapting the OPP to the MMC by means of closed-loop pulse pattern control. The method also comprises, based on the adapted OPP, sending firing signals to the plurality of cells of each branch.

According to another aspect of the present invention, there is provided a computer program product comprising computer-executable components for causing a controller to perform the method of any preceding claim when the computer-executable components are run on processing circuitry comprised in the controller.

According to another aspect of the present invention, there is provided a controller configured for controlling a power converter. The controller comprises processing circuitry, and storage storing instructions executable by said processing circuitry whereby said controller is operative to obtain an OPP for a DC-to-AC MMC having a three-phase AC side connected to a three-phase AC network and having a DC side connected to a DC network, wherein the MMC has a double-star topology with a plurality of phase-legs, each phase-leg having a first branch and a second branch, each of the first and second branches comprising a plurality of series connected converter cells. The controller is also operative to adapt the OPP to the MMC by means of closed-loop pulse pattern control. The controller is also operative to, based on the adapted OPP, send firing signals to the plurality of cells of each branch.

By means of the closed-loop pulse pattern control, the pre-calculated OPP can be adapted for the MMC to reduce influence of disturbances e.g. due to capacitor voltage ripples of the capacitors of each converter cell.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
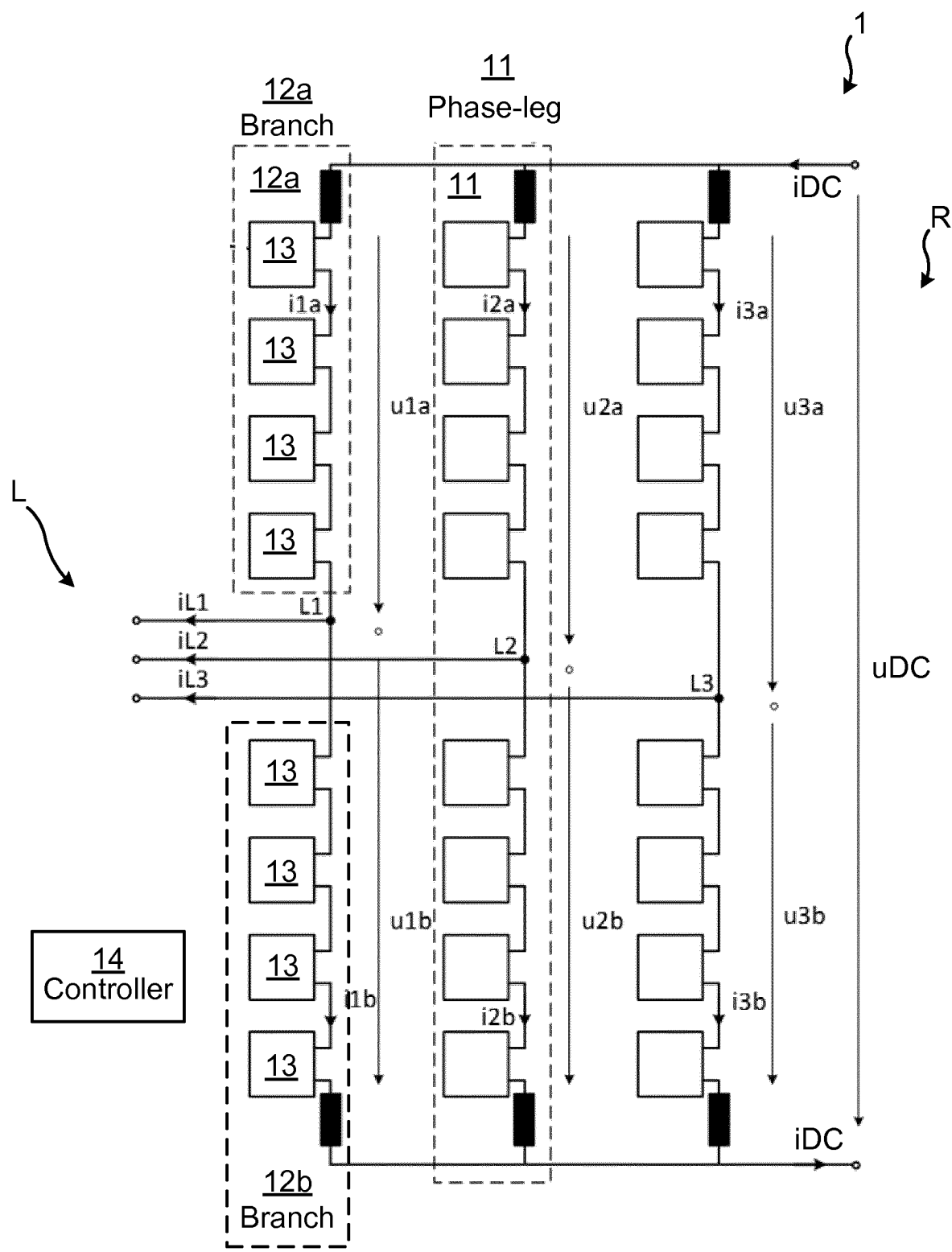
FIG. 1 is a schematic block diagram of an embodiment of an MMC in double-star configuration, in accordance with the present invention.

FIG. 1 is a schematic illustration of a DC-to-AC MMC 1 in direct double-star configuration between an AC network L, which is a three-phase network having currents iL1, iL2 and iL3, and a DC network R having the current iDC and the voltage uDC. The AC network may e.g. be a national power distribution network which may have a nominal fundamental frequency (also called power line/mains/utility frequency) of for instance 50 or 60 Hz. The DC network R may e.g. be for renewable energy production such as including photovoltaic and/or wind power generator(s), or for BESS, HVDC, electric drives etc.

The MMC 1 comprises a plurality of phase legs 11, here three (one per phase of the AC network L), where each phase leg comprises a first (upper) branch (arm) 12a and a second (lower) branch 12b. Each branch 12 comprises a plurality of series connected converter cells 13, and typically also a reactor (shown in black). In the figure, the currents and voltages relating to the first branches 12a are indexed "a" while the currents and voltages relating to the second branches 12b are indexed "b". Typically, each branch 12 comprises the same number of cells 13. Embodiments of the present invention may be particularly useful for a relatively small number of cells per branch, why the number of series connected cells in each branch may be at most 20 cells, e.g. within the range of 5 to 20 cells, or at most 10 cells.

The MMC 1 also comprises a controller 14 which is schematically shown in FIG. 1. The controller may be a control system comprising a central unit and/or distributed units associated with respective legs 11 or branches 12. The controller 14 may be configured, e.g. by means of computer software, to perform embodiments of the method of the present disclosure.

The MMC 1 may be a medium voltage converter, e.g. having a voltage rating of less than 30 kV (thus being configured for an operating voltage of less than 30 kV) and/or a power rating within the range of 10 to 60 MW, e.g. 15 to 30 MW (thus being configured for an operating power within the range of 10 to 60 MW, e.g. 15 to 30 MW).

The converter cells 13 may be any type of conventional MMC cell, such as a type of unipolar (half-bridge) or bipolar (full-bridge, H-bridge) cell. The invention does not require the cells to be bipolar, why at least one, some or all of the cells 13 of each branch 12 may in some embodiments of the invention be unipolar cells. Different types of unipolar and bipolar cells are well-known in the art.

Figure 2:
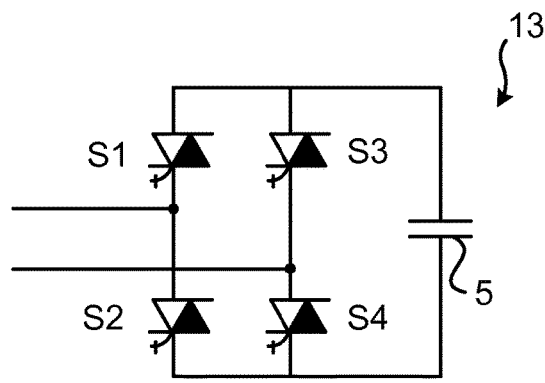
FIG. 2 is a schematic diagram of an embodiment of a bipolar converter cell, in accordance with the present invention.

FIG. 2 illustrates an example of a bipolar cell 13. The cell comprises an energy storing device 5, here in the form of a capacitor. The capacitor 5 may give rise to voltage ripples, which may be compensated for by means of embodiments of the present invention. The energy storing device 5 may comprise a capacitor arrangement with any number of capacitors in series and/or parallel connection with each other. The cell 13 also comprises four semiconductor switches S, forming the full-bridge (H-bridge) topology in the cell. Similarly, a corresponding unipolar cell 13 comprises only two semiconductor switches S, forming a half-bridge topology. Any number of semiconductor switches may be used, and the cell with four switches shown in the figure is only an example. The semiconductor switches of the bipolar cell are conventionally named in the figure as S1 switch, S2 switch, S3 switch and S4 switch. When the switches S1 and S4 are closed and S2 and S3 are open, the cell is in a +1 state in which a positive voltage will be applied. By opening S1 and S4 switches and closing S2 and S3 switches, this voltage is reversed whereby the cell is in a −1 state and a negative voltage will be applied. Regardless of whether a bipolar or unipolar cell is used, each of the S switches may comprise e.g. an insulated-gate bipolar transistor (IGBT) or a gate commutated thyristor GCT (in which case a snubber circuit may also be needed), for instance an integrated gate commutated thyristor (IGCT), a reverse-conducting IGCT (RC-IGCT) or a bi-mode GCT (BGCT), possibly in combination with an antiparallel one-direction conducting/blocking component such as a diode. In the example of FIG. 2, each S switch comprises an IGCT and antiparallel diode.

Embodiments of the present invention may be especially advantageous for cells 13 having a relatively low switching frequency, e.g. of at most 125 Hz, e.g. at most 100 Hz or 50 Hz. In some embodiments, the cells of the MMC has a switching frequency equal to the nominal fundamental frequency of the three-phase AC network L, e.g. 50 Hz or 60 Hz.

Medium voltage DC/AC MMCs are expected to be found in e.g. solar or other DC grids, battery energy storage systems and variable speed drives. The latter includes pumped hydro storage plants. In the lower power range, only a few cells are needed. This leads to a low number of voltage levels at the converter phase terminals, which may result in an inferior harmonic performance of the converter 1.

In addition, it is of interest to keep the switching frequency low in order to reduce switching losses and therefore increase the converter's efficiency.

The two aforementioned issues pose significant challenges regarding the product competitiveness, especially in the low power range. Moreover, and even if it might not be desirable, a filter on the three-phase side might be eventually needed in order to meet the AC grid-side harmonic requirements. In this case, a modulation method which facilitates the design of such a filter may be chosen.

Conventional methods, such as Carrier-Based Pulse Width Modulation (CB-PWM) are not an option for such operating conditions. Even more advanced modulators based on converter virtual flux and hysteresis (tolerance) bands may not provide in such conditions the required harmonic performance.

The aforementioned shortcomings of the state-of-the-art control and modulation methods may then necessitate the use of OPPs. However, OPPs may not be easily combined with a closed-loop control system for several reasons. First, the discontinuity of the switching angles when varying the modulation index prevents the use of linear controllers due to stability issues. Second, unlike modulation methods with a fixed modulation cycle such as carrier-based pulse width modulation (CB-PWM) and space vector modulation (SVM), OPPs are associated with a non-zero ripple current at regularly-spaced sampling instants. The bandwidth of a conventional current controller thus has to be slow, limiting the capability of the controller to reject disturbances and to react to the transients.

Further, OPPs are typically calculated considering ideal conditions, i.e., neglecting system disturbances. This limits the applicability of OPPs to MMC configurations without additional control actions, due to the considerable inherent capacitor voltage ripples and other system non-idealities.

Figure 3:
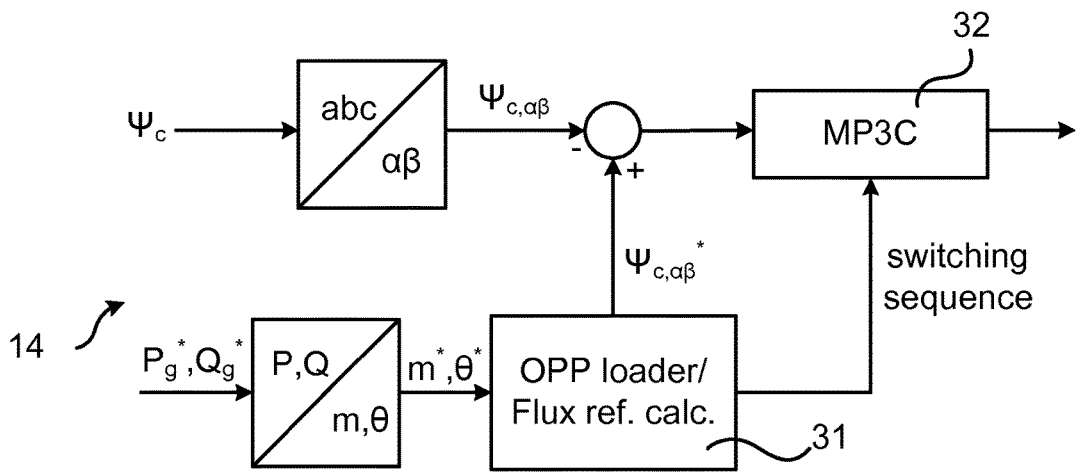
FIG. 3 is a schematic functional block diagram of an embodiment of a converter controller, in accordance with the present invention.

In accordance with the present disclosure, the above-mentioned problems are tackled by means of a closed-loop pulse pattern control concept. The closed-loop pulse pattern control concept is illustrated in FIG. 3 in which functionality of an embodiment of the controller 14 is schematically shown. An MP3C control 32 (which typically is a non-linear control) is used to adjust the OPP 31 which has been calculated (in the controller 14 or externally of the controller and then received by said controller 14) for ideal conditions. Given the active and reactive power references P9 and Q9, respectively, the estimate of the virtual grid flux vector and the grid inductance, the ideal reference of the fundamental virtual converter flux vector is determined.

The magnitude of the fundamental virtual converter flux vector reference is translated into a desired modulation index m* and the respective argument to a rotating angle reference θ*. If the desired modulation index differs by a certain threshold from the actual modulation index a (new) switching sequence is loaded with the desired pulse number d. The integral of the switched voltage waveform constitutes the reference trajectory of the instantaneous virtual converter flux vector $\psi_{c,\alpha\beta}^*$.

The controller forces the virtual converter flux $\psi_{c,\alpha\beta}$ to track the OPP flux trajectory. To achieve this, the controller aims to minimize the flux error in stationary reference frame, $$\psi_{e,\alpha\beta} = \psi_{c,\alpha\beta}^* - \psi_{c,\alpha\beta} \quad (1)$$

by modifying the switching angles of the OPP. In the simplest case, a dead-beat (DB) controller can be used in the abc-coordinates, leading to the correction times $$\Delta t = \frac{\psi e}{-du V_{lvl}} \quad (2)$$

where $\psi_e$ denotes the flux error in abc-coordinates, $du=U_i-U_{i-1}$ denotes the change in the switch position of the switching sequence and $V_{lvl}$ corresponds to the voltage step in the phase voltage waveform. Thus, the MP3C may have a 'deadbeat' nature, but not in the sense of trying to bring the error to zero at the next sampling time instant. Instead the error may be put to zero within the next switching transitions that follow in at least two system phases. At least two phases may be needed to bring the error to zero in a three-phase system, which is controlled using an αβ coordinate transformation.

This pulse pattern control method is referred to as Model Predictive Pulse Pattern Control (MP3C). The flux error is minimized over a prediction horizon by computing a modified switching sequence. Only the first part of the switching sequence within the time interval t, $t+T_s$ is applied to the converter, where $T_s$ denotes the sampling interval. At the next sampling instant, using new measurements (or estimates), the flux error minimization is repeated over a shifted or receding prediction horizon. This so-called receding horizon policy provides feedback and ensures that the controller is robust to parameter uncertainties. The condition on the horizon is to have at least two switching events in two different phases in order to be able to drive the flux error to zero in the αβ-reference frame.

A few constraints may also be added to the control problem:

A switching transition cannot be moved to the past (or the previous sampling interval).

A switching transition cannot be moved before or after another switching transition in that phase.

It is noted that such a three-phase control and modulation approach is beneficial for switching frequency reduction, as any of the three phases can be used for flux error minimization. This is contrary to a modulation concept that is based on a single branch. Furthermore, thanks to the dead-beat control behaviour of the pattern controller, fast current and power responses may be achieved during transients. The term 'fast' herein implies that the MP3C may not act on the average (fundamental) waveform, like a conventional 'slow' controller would do. Instead, it may act rather on the instantaneous quantity, which is the OPP switching control signal (by shifting the switching times). This gives a faster response time, e.g. instead of milliseconds, the control could act on the system in the range of microseconds.

Another MP3C variety formulates a quadratic program (QP). The QP may be solved using for example an active set method. MP3C is in itself known, but for other converter topologies, see e.g. U.S. Pat. No. 8,766,570 and the Institute of Electrical and Electronics Engineers (IEEE) paper "Model predictive pulse pattern control" to T. Geyer, N. Oikonomou, G. Papafotiou and F. D. Kieferndorf, IEEE Trans. on Industry Applications, vol. 48, no. 2, pp. 663-676, March/April 2012.

Figures 4A, 4B:
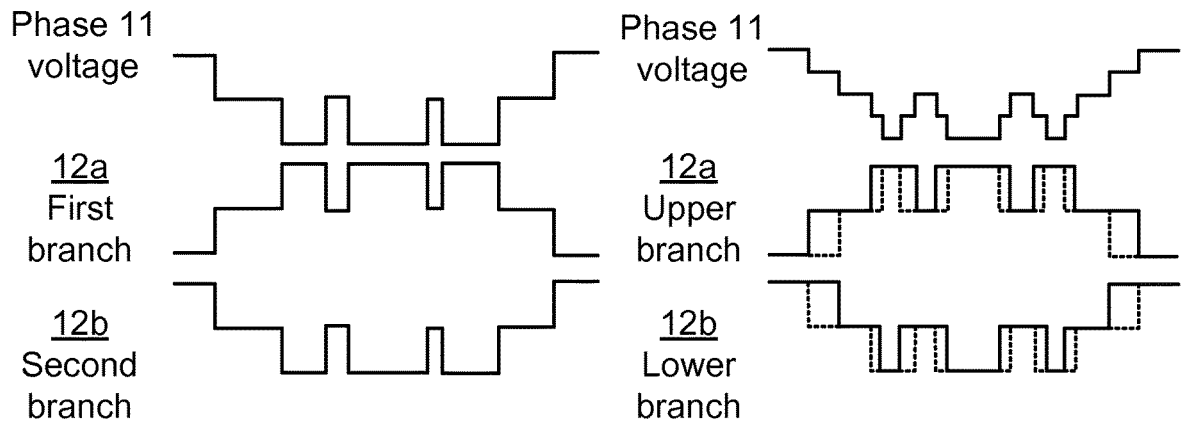
FIG. 4a is a schematic illustration of an embodiment of N+1 modulation, where voltage is on the vertical axis and time on the horizontal axis.
FIG. 4b is a schematic illustration of an embodiment of 2N+1 modulation, where voltage is on the vertical axis and time on the horizontal axis.

Two different types of modulations can be applied to the double star-configured DC/AC MMC 1. They are tightly linked to the number of levels in the phase voltage waveform and influence the way the circulating current control can be performed. They are graphically presented in FIGS. 4a and 4b, respectively, where the voltage of the phase-leg 11 is given by the combination of the respective voltages of the first branch 12a and the second branch 12b, since there is in this example no circulating current to consider. FIG. 4a illustrates an embodiment of N+1 modulation, where the first and second branch modulations are symmetrical in the absence of a circulating current. FIG. 4b illustrates an embodiment of 2N+1 modulation, where if the dotted lines are followed, the N−1 redundant level is obtained, else the N+1 redundant level is obtained.

N+1 modulation: both the first and second branches 12 of the same phase-leg 11 are switched synchronously in opposite manner when a switching event occurs on the phase voltage pattern. The sum of the inserted cells in the first branch 12a ($n_1$) and in the second branch 12b ($n_2$) per phase-leg 11 is always equal to N: $n_1+n_2=N$.

2N+1 modulation: only one of the two branches 12 is switched when a switching event occurs on the phase voltage pattern. As a result, the number of voltage levels is almost doubled for the same switching frequency. The first and second branches are switched in an asynchronous manner, and as a consequence the sum of inserted cells 13 per phase-leg 11 is not anymore always equal to N, but can take three values: $n_1+n_2=\{N-1,N,N+1\}$.

If a circulating current is used for balancing the power of different branches 12, the circulating current control may be performed through the timing/insertion of the so-called redundant levels. The redundant levels are any sum of positive and negative branch insertion indices that do not equal N. The closest neighbours are N+1 and N−1, and they may be accessed without increasing the cell switching frequency.

In N+1 modulation, those redundant levels have to be actively inserted by switching transition advance/delay in a symmetrical manner between the first and second branches 12. A symmetrical correction reduces the negative impact on the three-phase converter flux.

In 2N+1 modulation, the redundant levels are present by default and the only degree of freedom is their selection (either N+1 or N−1), but not their duration. This affects the way the circulating current can be controlled, as well as the possible achievable control performances.

N+1 modulation type: The circulating current control for N+1 modulation is added to the existing grid flux MP3C control 32. The circulating current error is translated into a correction time that will be applied in an opposite manner (different sign) to the first and second branches 12 of the same phase-leg 11, minimizing the impact on the grid flux. The correction time may be calculated as:

$$dt_{corr} = -2L_{br}\frac{\Delta i_{circ}}{V_{lvl}} \quad (3)$$

It has the particularity to be intermittent, i.e., the circulating current control is effective only in the vicinity of the switching transitions. For the control of the circulating current, a so called Dead-Beat (DB) Circulating Current Control, DBC3, may be used.

It is also noted that some special cases might arise and may be handled:
- A switching transition originally occurring in $[t, t+T_s]$ might be shifted to the next sampling interval in one of the two branches 12. A memory element may therefore be added, which may momentarily store the transition until it should be applied. If the switching transition is lost, the phase pattern might contain some undesirable discontinuities.
- A switching transition originally occurring in $[t+T_s, t+2T_s]$ might be shifted to the current sampling interval in one of the two branches. A memory element may therefore be added, which may momentarily store the transition until it is applied in the other branch. In addition, the pattern pointer has to be incremented: the original switching transition in the phase cannot be modified anymore to control the converter phase flux.

2N+1 modulation: The 2N+1 modulation may not be deployed without a switching event distribution logic. This logic selects between the N+1 and N−1 redundant levels (N−x/N+x redundant levels or additional N−1/N+1 redundant levels are also possible through a pulse insertion technique at the expense of increased switching frequency) in a hysteresis control manner. This implies that it is reacting on the sign of the circulating current error $i_{circ,err}=i_{circ}*-i_{circ}$. With a low number of cells 13 in a branch 12, the circulating current may feature a strong ripple at a low frequency (but higher than the switching frequency). The peak-to-peak circulating current ripple may be directly estimated from the generated OPP:

$$\Delta i_{circ,max} = \frac{V_{lvl}^*/2\Delta t_{red,max}}{2L_{br}} \quad (4)$$

where $\Delta t_{red,max}$ is the maximum duration of a redundant level in the pattern. Note that this value changes for each modulation index m. It may be important to emphasize that this high ripple is not visible in the three-phase grid currents. For possible transitions with 2N+1 modulation, the switching transition information may be combined with the current switch position in order to define a Level Selector (LS) table (either N+1 or N−1 redundant level).

Only one exception case is considered here: between two consecutive sampling intervals $[t, t+T_s]$ and $[t+T_s, t+2T_s]$, it might occur that the sign of the circulating current error changes. It is even more likely to happen as the circulating current ripple is high. This would mean that the applied redundant level should be modified (N+1↔N−1). However, this may not be possible without increasing the switching frequency. As a consequence, the applied redundant level is locked until a non-redundant level is applied.

The circulating current may be regulated along a reference trajectory with a certain amplitude and frequency.

The proposed closed loop-controlled OPPs and fast circulating current controllers may be interfaced in a straightforward manner to the higher level MMC inner voltage control. This is illustrated in FIG. 5a for the cases of N+1 level modulation and in FIG. 5b for the 2N+1 level modulation.

Figure 5A:
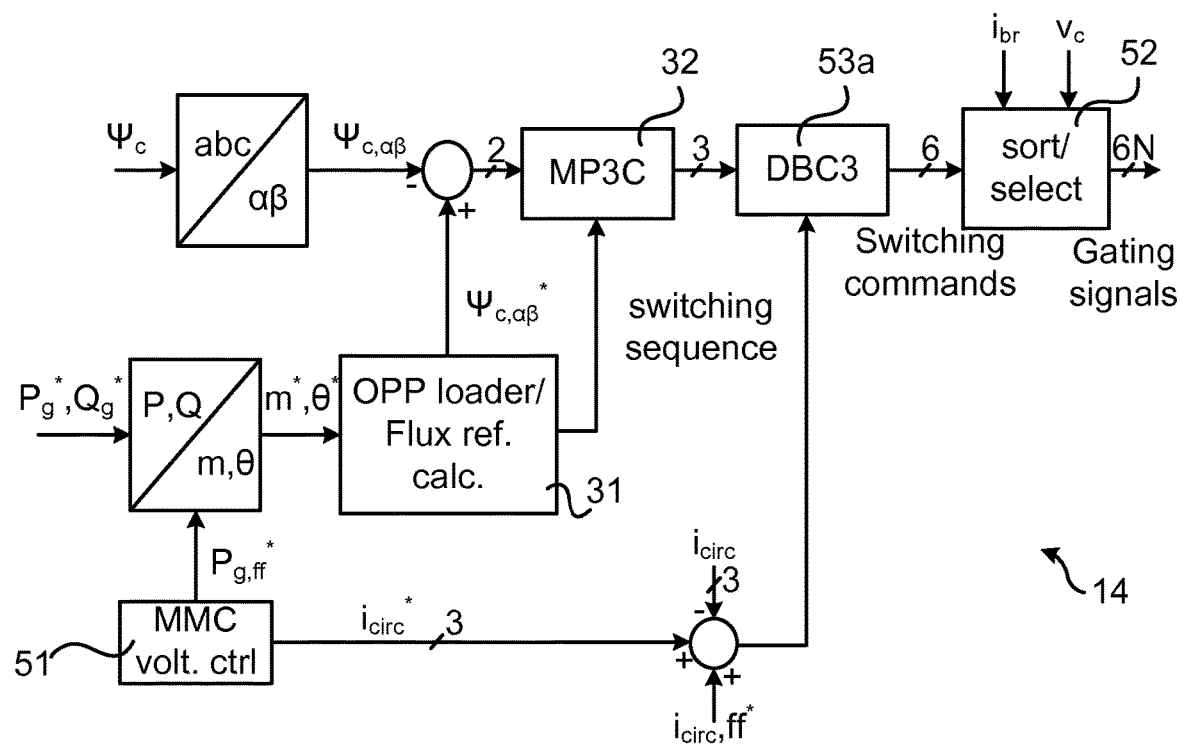
FIG. 5a is a schematic functional block diagram of an embodiment of a converter controller including DBC3, in accordance with the present invention.

With N+1 level modulation, a circulating current controller 53 in the form of a DBC3 53a is used with input from the MMC voltage control 51 as illustrated in FIG. 5a.

Figure 5B:
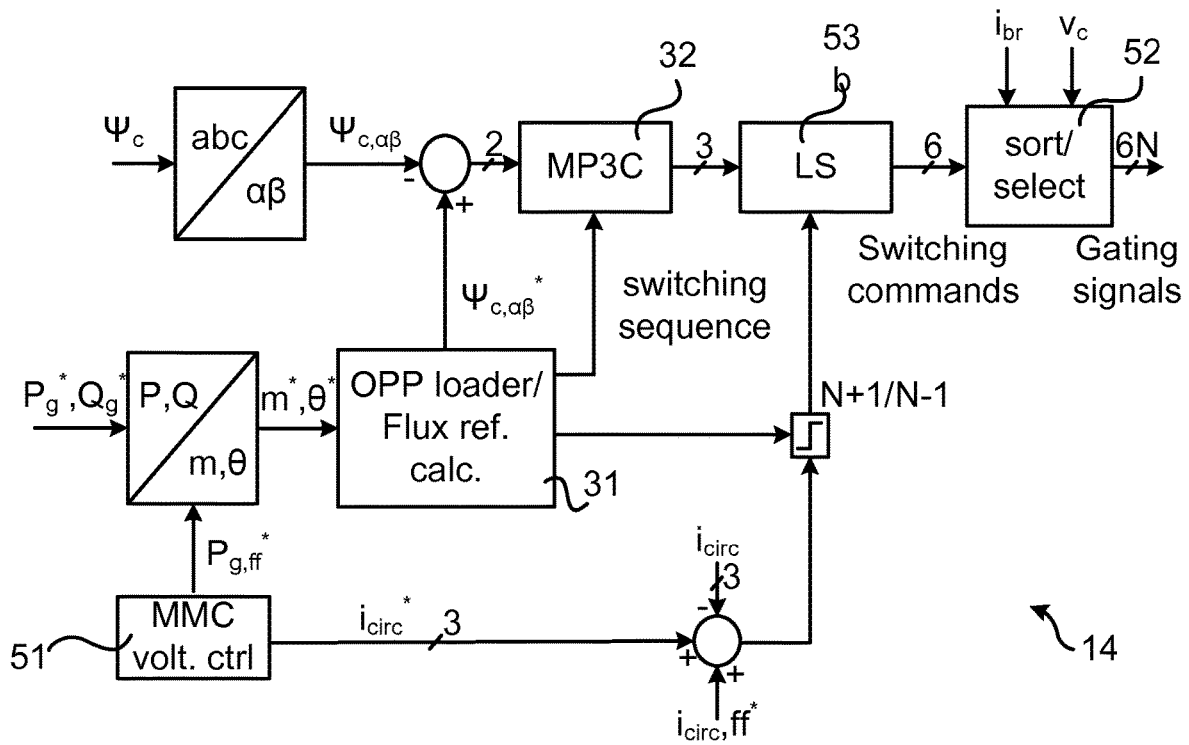
FIG. 5b is a schematic functional block diagram of an embodiment of a converter controller including hysteresis circulating current control, in accordance with the present invention.

With 2N+1 level modulation, a circulating current controller 53 in the form of a hysteresis circulating current control (⌐) in combination with a Level Selector 53b is used with input from the MMC voltage control 51 as illustrated in FIG. 5b.

The MMC voltage control 51 (upper layer MMC inner voltage control) is responsible for controlling the average converter DC-link voltage (total energy) by means of adjusting the three-phase power reference as needed. It also ensures that no unbalance occurs between the sums of the cell capacitors 5 voltages in each branch 12. This is achieved by introducing appropriate circulating currents $i_{circ}*$ with specific amplitudes and frequencies. It is noted that other feed-forward terms may be also added to the circulating current references $i_{circ,ff}*$ for achieving different purposes, such as capacitor voltage ripple minimization etc. A conventional sorting/selection algorithm 52 may be used to choose the cells 13 to switch.

As previously mentioned, an argument for using OPPs 31 is the ability of actively shaping the spectrum through an optimization procedure. The whole converter control system has been simulated.

For the cases of N+1 as well as 2N+1 modulation, the converter 1 is operated at a switching frequency of $f_{sw}=50$ Hz. In both cases, the voltage total demand distortion (TDD) was minimized. It is clear that the TDD in the 2N+1 case is lower, since there are twice as many degrees of freedoms for minimizing it. However, this case has a higher impact on the inner converter magnitudes, e.g., a larger branch reactor is needed in order to minimize the higher branch current ripple.

Especially for the N+1 case, the results showed a very discrete spectrum without the presence of either even harmonics or interharmonics. In the specific example, no restriction was put on specific harmonics, therefore lower order ones, such as the $7^{th}$ and $11^{th}$ do appear, for which the relevant grid standards normally allow for a higher amplitude.

Moreover, it might be beneficial to cancel such low order harmonics, especially in the presence of AC grid side resonances that tend to threaten the fulfillment of such limits. According to the degree of freedom, i.e., the pulse number d, several harmonics may be limited or even cancelled. For an N+1 modulation the voltage TDD was minimized while imposing constraints on the $7^{th}$ and $11^{th}$ harmonics using specific weighting factors. The harmonic energy content may be either placed in triplen harmonics, which are cancelled out on a line voltage level and/or shifted to higher frequencies, facilitating the design of a grid filter.

Thanks to its receding horizon policy and despite the low apparent branch switching frequency, the MP3C strategy offers good performance regarding power transients. When the power reference changes, the modulation index is updated according to the new power reference. A three-phase power step may be tracked within a few milliseconds. Moreover, the circulating current control makes it possible to track any changes in the reference in a rapid manner. Undesired overshoots in the circulating current reference may be avoided by properly tuning the total MMC energy controller or by controlling the DC part of the circulating current directly on a DC-link level.

The transient performance may be even further increased with the pulse insertion method. If, alternatively, a slower transient response is desired, the reference may be changed in a ramped rather than a stepped manner.

The capacitor 5 voltages, for reasons of grid overvoltage handling or redundancy reasons, may not be expected to sum up to $u_{DC}$ per phase-leg 11. This implies that the number of cells 13 inserted in the first and second branches 12 no longer meet the equations $$\begin{cases} n_{up} = \dfrac{N}{2} - u_L \\ n_{low} = \dfrac{N}{2} + u_L \end{cases} \quad (5)$$

as in the ideal case. This implies the adaptation of the integer part N/2 to one of the smaller integers, e.g. N/2−1. For instance, three cells 13 may have to be permanently inserted for each of the first and second branches 12 and would replace the N/2 terms in equation (5). The remaining part, i.e., $V_{circ,DC} = V_{bus}^* - 2n_{DC}V_c^*$ is inherently provided by the total phase-leg capacitor voltage controllers. That component may however remain small in order not to compromise the circulating current control due to a reduction of $v_{circ}$, since a fraction of it may be used to accommodate the DC voltage. Consequently, it may be convenient to coordinate $V_c^*$ with $V_{bus}^*$ to always operate close to an even integer multiple of $V_c^*$ ($V_{bus}^* \approx 2n_{DC}V_c^*$).

The OPP calculator or loader 31 may typically consider an odd number of voltage levels. With an even number of voltage levels, the switching transitions at 0 and π are fixed, leading to the same number of degrees of freedom d−1 as an even number of cells corresponding to (N−1). The definition of the inserted branch cell number should avoid running into non-integer values.

The DC current of the DC network R may be explicitly controlled by adjusting $V_{bus}^*$. In this way, the total converter energy may be controlled through the DC terminal rather than through the AC terminal. Note that the feed-forward term $I_{DC,ff}$ is optional. The term $n_{DC}$ replaces N/2 in equation (5).

Figure 6:
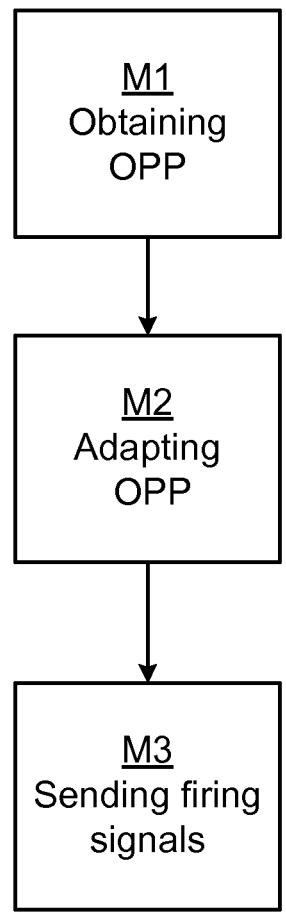
FIG. 6 is a schematic flow chart of an embodiment of the method of the present invention.

FIG. 6 is a schematic flow chart of an embodiment of the method of the present invention. The method may be performed in/by a controller 14 of the MMC 1. The method is for controlling a direct DC-to-AC MMC 1 having a three-phase AC side connected to a three-phase AC network L and having a DC side connected to a DC network R. The MMC has a double-star topology with a plurality of phase-legs 11, each phase-leg having a first branch 12a and a second branch 12b, each of the first and second branches 12 comprising a plurality of series connected converter cells 13. An OPP 31 for the MMC is obtained M1, e.g. calculated offline internally in the controller 14 or externally of the controller and then received by said controller. Then, the OPP is adapted M2 to the MMC 1 by means of closed-loop pulse pattern control 32, e.g. MP3C. Based on the adapted M2 OPP 31, firing signals (for switching the semiconductor switches S) are sent M3 to the plurality of cells 13 of each branch 12 to implement the control of the MMC.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of controlling a DC-to-AC Modular Multi-level Converter, MMC, having a three-phase AC side connected to a three-phase AC network and having a DC side connected to a DC network, wherein the MMC has a double-star topology with a plurality of phase-legs, each phase-leg having a first branch and a second branch, each of the first and second branches comprising a plurality of series-connected converter cells, the method comprising:
   obtaining a pre-calculated Optimized Pulse Pattern, OPP, for the MMC;
   adapting the OPP to the MMC by means of closed-loop pulse pattern control which is a Model Predictive Pulse Pattern Control, MP3C, having a receding horizon policy; and
   based on the adapted OPP, sending firing signals to the plurality of cells of each branch,
   wherein the MMC has a switching frequency of less than 125 Hz and wherein the three-phase AC network has a nominal fundamental frequency of 50 or 60 Hz.

2. The method of claim 1, wherein the adaptation of the OPP comprises circulating current control.

3. The method of claim 2, wherein the circulating current control comprises Dead-Beat Circulating Current Control, DBC3.

4. The method of claim 3, wherein the obtaining of an OPP comprises calculating the OPP offline.

5. The method of claim 3, wherein the plurality of cells in each branch is at most 20 cells, e.g. within the range of 5 to 20 cells, or at most 10 cells.

6. The method of claim 3, wherein the MMC has a switching frequency equal to a nominal fundamental frequency of the three-phase AC network.

7. The method of claim 2, wherein the circulating current control comprises hysteresis circulating current control.

8. The method of claim 7, wherein the obtaining of an OPP comprises calculating the OPP offline.

9. The method of claim 7, wherein the plurality of cells in each branch is at most 20 cells, e.g. within the range of 5 to 20 cells, or at most 10 cells.

10. The method of claim 2, wherein the obtaining of an OPP comprises calculating the OPP offline.

11. The method of claim 2, wherein the plurality of cells in each branch is at most 20 cells, e.g. within the range of 5 to 20 cells, or at most 10 cells.

12. The method of claim 2, wherein the MMC has a switching frequency equal to a nominal fundamental frequency of the three-phase AC network.

13. The method of claim 1, wherein the obtaining of an OPP comprises calculating the OPP offline.

14. The method of claim 13, wherein the plurality of cells in each branch is at most 20 cells, e.g. within the range of 5 to 20 cells, or at most 10 cells.

15. The method of claim 1, wherein the plurality of cells in each branch is at most 20 cells, e.g. within the range of 5 to 20 cells, or at most 10 cells.

16. The method of claim 1, wherein the MMC has a switching frequency equal to a nominal fundamental frequency of the three-phase AC network.

17. The method of claim 1, wherein the MMC has an operating voltage of less than 30 kV.

18. The method of claim 1, wherein at least some, or all, of the plurality of converter cells in each branch are unipolar cells.

19. A computer program product comprising computer-executable components for causing a controller to perform the method of claim 1 when the computer-executable components are run on processing circuitry comprised in the controller.

20. A controller configured for controlling a power converter, the controller comprising:
processing circuitry; and
storage storing instructions executable by said processing circuitry whereby said controller is operative to:
obtain a pre-calculated Optimized Pulse Pattern, OPP, for a DC-to-AC Modular Multilevel Converter, MMC, having a three-phase AC side connected to a three-phase AC network and having a DC side connected to a DC network, wherein the MMC has a double-star topology with a plurality of phase-legs, each phase-leg having a first branch and a second branch, each of the first and second branches comprising a plurality of series connected converter cells;
adapt the OPP to the MMC by means of closed-loop pulse pattern control which is a Model Predictive Pulse Pattern Control, MP3C, having a receding horizon policy, and
based on the adapted OPP, send firing signals to the plurality of cells of each branch;
wherein the MMC has a switching frequency of less than 125 Hz and wherein the three-phase AC network has a nominal fundamental frequency of 50 or 60 Hz.

* * * * *